March 11, 1952

E. ALTMAN 2,588,790

PEAR CORING MACHINE

Filed July 23, 1947

E. Altman
INVENTOR

BY C.A.Snow&Co.
ATTORNEYS.

March 11, 1952  E. ALTMAN  2,588,790
PEAR CORING MACHINE
Filed July 23, 1947  6 Sheets-Sheet 2

E. Altman
INVENTOR

BY C.A. Knowles.
ATTORNEYS.

March 11, 1952  E. ALTMAN  2,588,790
PEAR CORING MACHINE
Filed July 23, 1947  6 Sheets-Sheet 3

E. Altman
INVENTOR
BY
ATTORNEYS.

March 11, 1952     E. ALTMAN     2,588,790
PEAR CORING MACHINE
Filed July 23, 1947     6 Sheets-Sheet 4
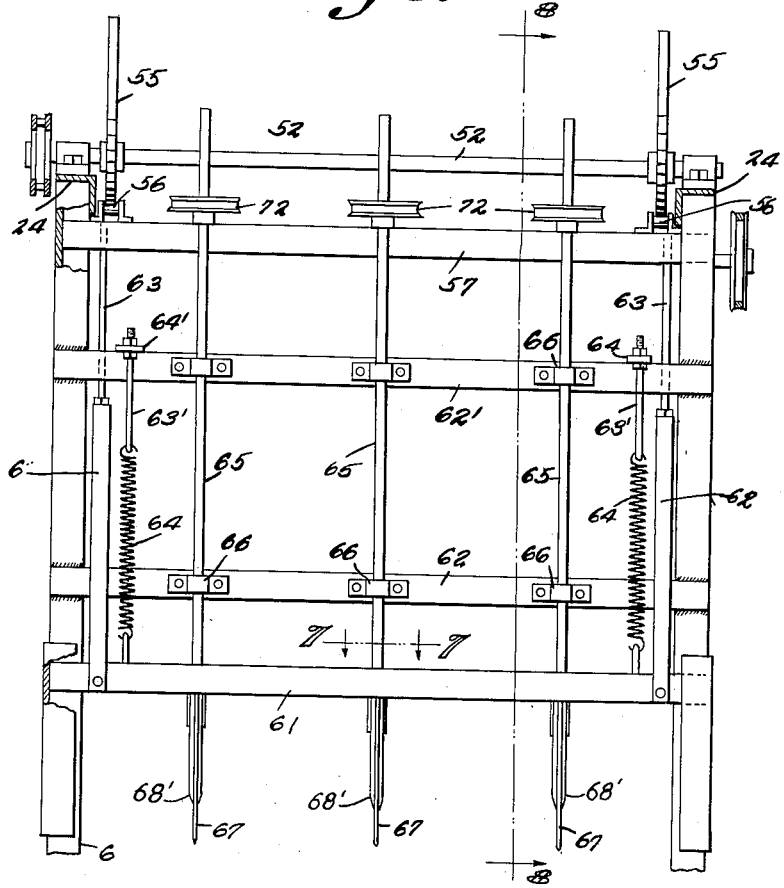
Fig. 5.
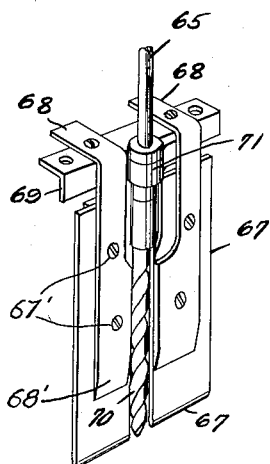
Fig. 6.
Fig. 7.
E. Altman
INVENTOR
BY C.A. Snow & Co.
ATTORNEYS.

March 11, 1952     E. ALTMAN     2,588,790
PEAR CORING MACHINE
Filed July 23, 1947     6 Sheets-Sheet 5
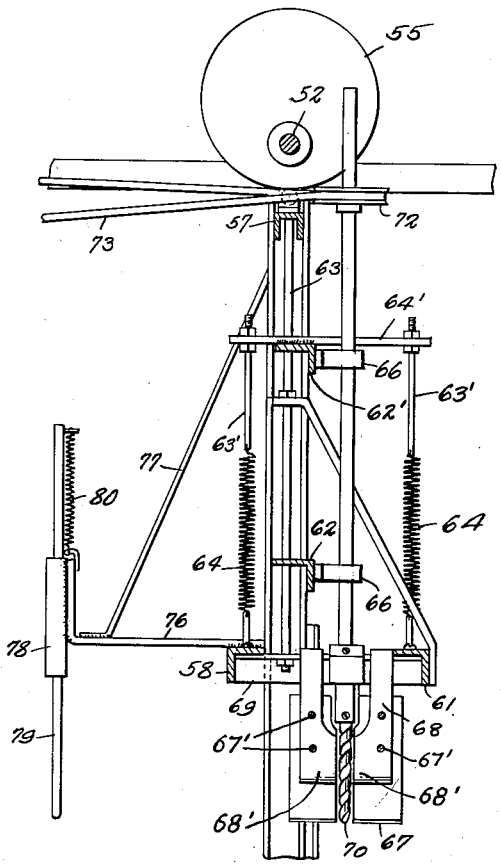
Fig. 8.
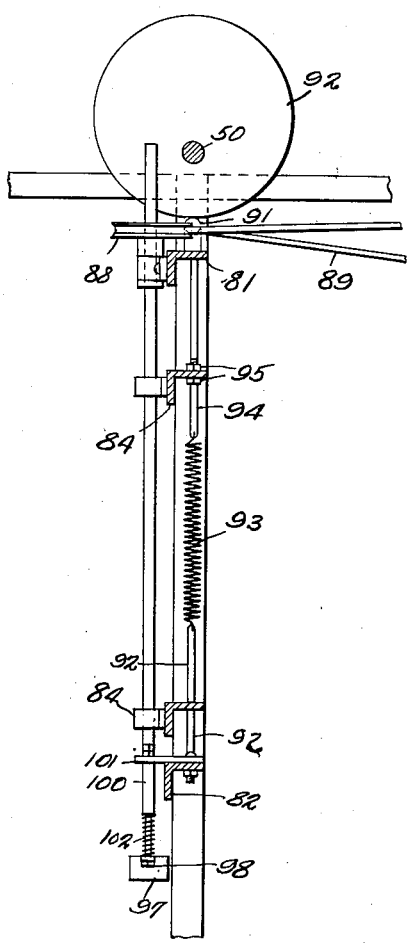
Fig. 9.
Fig. 10.
Fig. 11.
E. Altman
INVENTOR

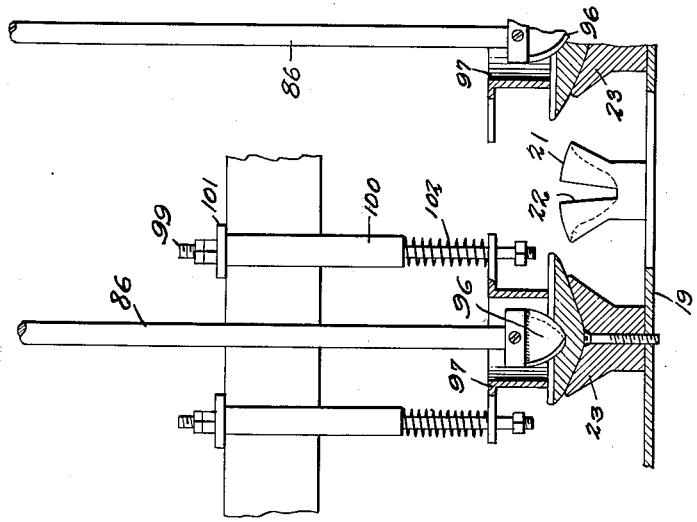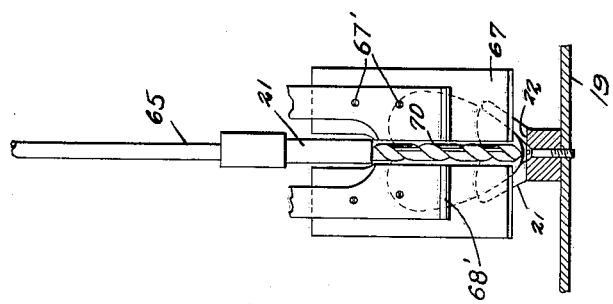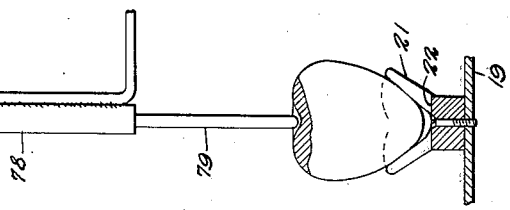

Patented Mar. 11, 1952

2,588,790

UNITED STATES PATENT OFFICE 2,588,790

PEAR CORING MACHINE

Eston Altman, Valdosta, Ga.

Application July 23, 1947, Serial No. 763,003

4 Claims. (Cl. 146—40)

By way of explanation, it might be stated that the recognized method of preparing fruit, particularly pears for canning, is to cut the fruit in halves and core the fruit by hand.

This method is exceptionally slow and tedious and the operators frequently injure their hands should the knife slip during the cutting and coring operation.

It is therefore the primary object of the present invention, to provide a machine wherein the pears to be prepared for canning, are positioned, by hand, and mechanical means provided for cutting the pears into halves and coring the pears.

An important object of the invention is to provide a device of this character including an endless chain of cups or receptacles into which the pears are dropped, mechanical means being provided for properly centering the pears for the slicing operation.

Another object of the invention is to provide means in the form of cups, which receive the halves of the pears, means being provided for properly centering the halves of pears so that they will be in direct alignment with the coring blades, for properly coring the sections of the pears passing through the machine.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 5 is a sectional view taken on line 5—5 of Figure 1.

Figure 6 is a perspective view illustrating one of the slicing blades and a blossom removing drill, associated therewith.

Figure 7 is a sectional view taken on line 7—7 of Figure 5.

Figure 8 is a sectional view taken on line 8—8 of Figure 5.

Figure 9 is a sectional view taken on line 9—9 of Figure 4.

Figure 10 is an enlarged elevational view illustrating one of the coring blades together with an associated adjusting ring, the adjusting ring being shown in section.

Figure 11 is a bottom plan view illustrating a coring blade and its guide member.

Figure 12 is an elevational view illustrating one of the centering pins as contacting a pear to center the pear for contact by the slicing blades.

Figure 13 is an elevational view illustrating the slicing blades and blossom drilling member as moving through a pear, the pear being shown in dotted lines.

Figure 14 is a fragmental sectional view illustrating one of the corer blades as operating to remove the core of the fruit, the blade being shown as operating through the centering ring.

Figure 1:
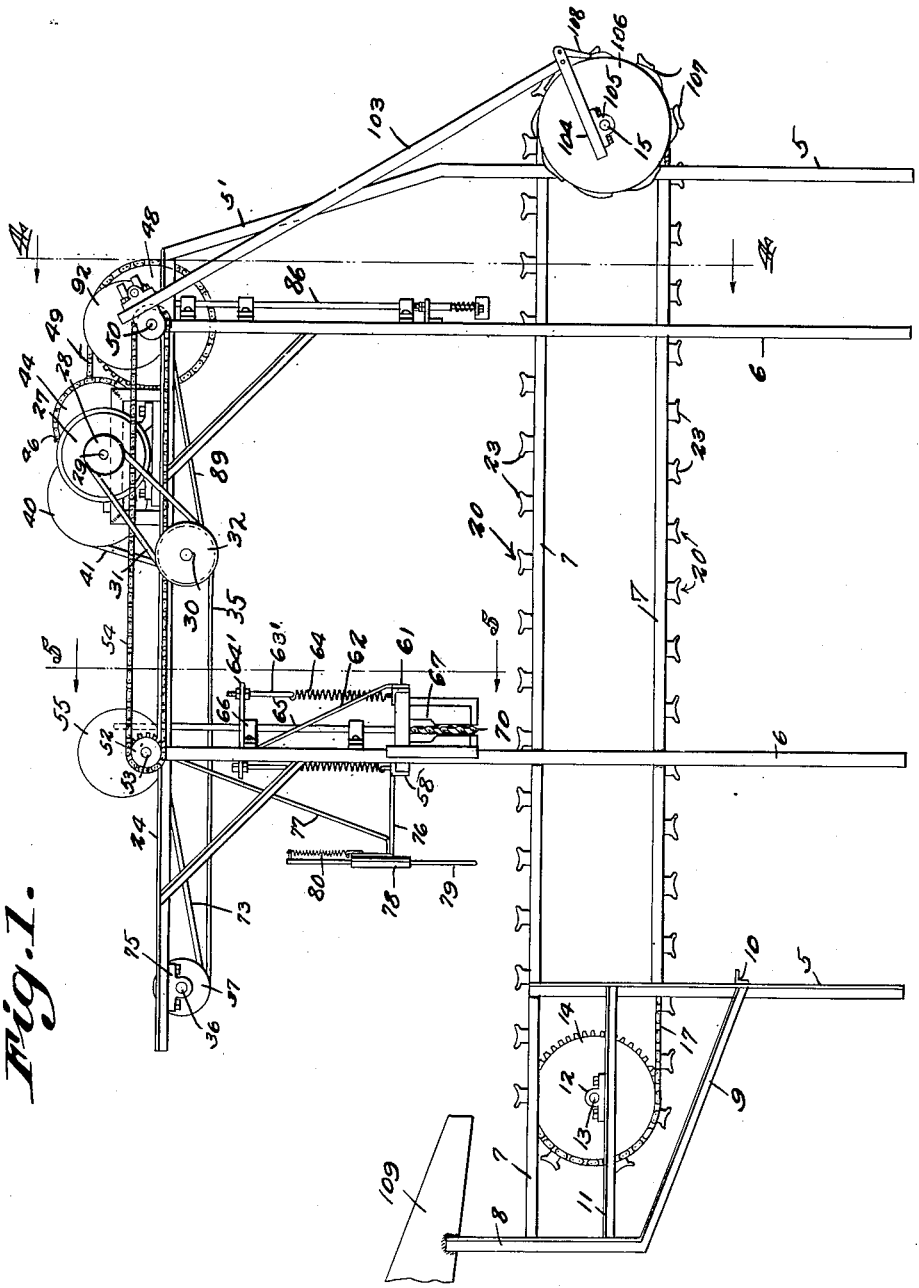
Figure 1 is a side elevational view of a slicing and coring machine, constructed in accordance with the invention.

Referring to the drawings in detail, the machine forming the subject matter of the present invention, comprises a frame embodying corner uprights 5 and intermediate uprights 6 arranged on opposite sides of the frame, the uprights being connected by the spaced parallel side bars 7.

The uppermost bars 7 are longer than the adjacent lower bars 7, the ends thereof extending beyond the corner uprights 5 at one end of the frame, as clearly shown by Figure 1 of the drawings, where they are connected with the bars 8, their upper ends being disposed above the bars 7, while the lower ends of the bars 8 are extended rearwardly as at 9, where they are secured to the uprights 5 at one end of the frame. Transverse bars 10 connect the uprights 5 at this end of the frame to provide an exceptionally rigid structure. Connecting the bars 8 and 5 at one end of the frame are horizontal bars 11 on which the bearings 12 are mounted, the bearings 12 accommodating the shaft 13 which carries the sprockets 14 at its ends.

Figure 2:
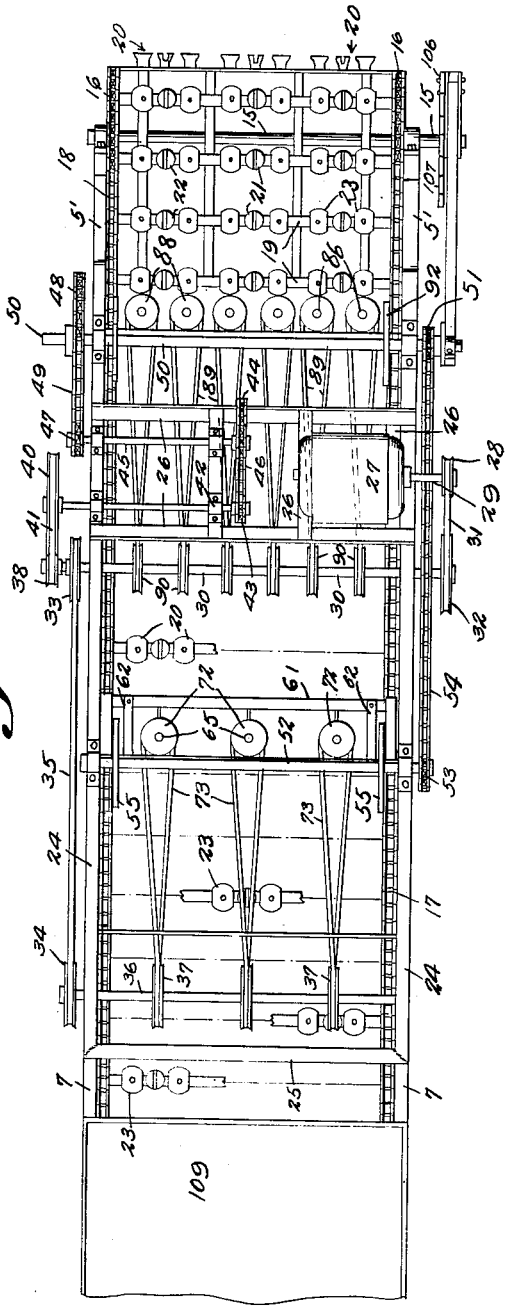
Figure 2 is a plan view thereof.
Figure 3:
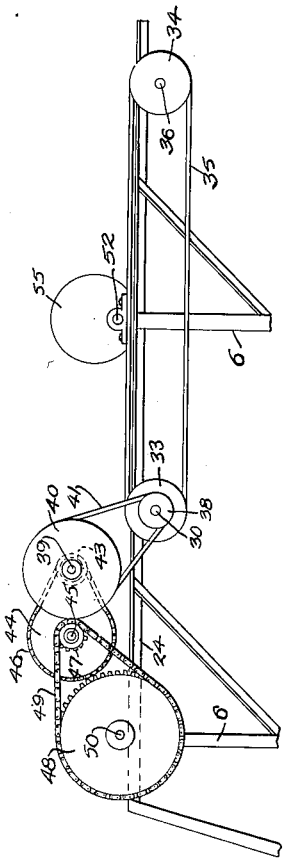
Figure 3 is a side elevational view of the machine.
Figure 4:
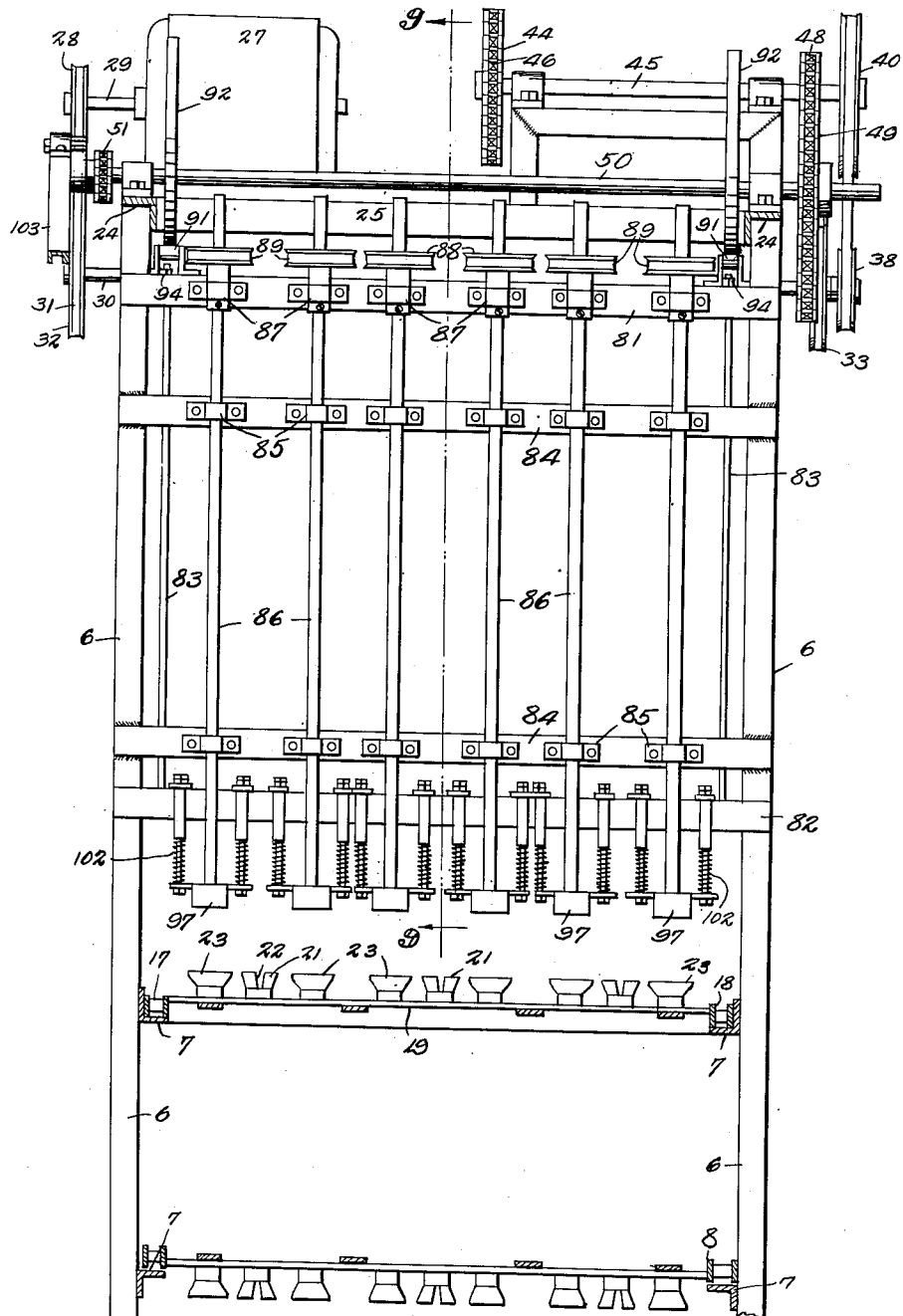
Figure 4 is a sectional view taken on line 4—4 of Figure 1.

As shown by Figure 2 of the drawings, the shaft 15 at the opposite end of the machine, provides a support for the sprockets 16 that are secured thereto to rotate therewith. These sprockets 16 are in a line with the sprockets 14 and provide the support for the endless chains 17 and 18 that operate in parallel spaced relation with respect to each other. Connecting the chains 17 and 18 at opposite sides of the frame, are bars 19 that are arranged in predetermined parallel spaced relation with respect to each other.

These bars provide supports for the groups of cups 20, each group embodying an intermediate cup 21 formed with slots 22 on opposite sides thereof, and lateral cups 23. Since these cups of the bars 19 are arranged in lines, it will be seen that they provide endless lines of lateral cups 23, and an endless line of intermediate cups 21. As clearly shown by Figure 1 of the drawings, the uprights 6 as well as the uprights 5 at opposite sides of the frame, extend appreciable distances above the bars 7, where the upper ends thereof are connected by means of the bars 24 that are held in spaced relation with respect to each other, by means of the bars 25.

The upper ends of the bars 5 at one end of the frame are inclined rearwardly at 5' and connect with the bars 24 and act as a further brace for the super frame on which the motor and gearing employed in operating the machine, are mounted.

Connecting the cross bars 24, are supporting bars 26 on which the motor 27 is mounted, the motor 27 having a pulley 28 mounted on its shaft 29, which pulley transmits movement to the shaft 30, through the belt 31, which belt 31 also operates over the pulley 32 secured to one end of the shaft 30. The shaft 30 is provided with a pulley 33 which transmits movement to the pulley 34, through the belt 35 that is shown as operating thereover, the pulley 34 being mounted on one end of the shaft 36 on which the pulleys 37 are secured.

Also secured to the shaft 30, is a pulley 38 which transmits movement to the shaft 39, through the pulley 40 and belt 41. The shaft 39 is mounted in the bearings 42 and has the sprocket 43 secured to one end thereof, the sprocket 43 transmitting movement to the sprocket 44 mounted on the shaft 45, through the chain 46. On one end of the shaft 45 is a sprocket 47 which transmits movement to the sprocket 48 through the medium of the chain 49 which operates thereover.

As clearly shown by Figure 2 of the drawings, the sprocket 48 is mounted on one end of the shaft 50 that extends across the superframe, one end of the shaft 50 being supplied with the sprocket 51 that transmits movement to the shaft 52, through the medium of the sprocket 53 mounted on one end of the shaft 52, and the chain 54 which operates over the sprockets 51 and 53. Secured to the shaft 52, to rotate therewith, are cam discs 55, which discs are so located that when they rotate, they will contact with the rollers 56 which are secured to the upper bar 57 of the movable cutter blade frame which moves adjacent to the stationary bars 58' of the main frame.

The frame also includes the angle bar 61 disposed in parallel spaced relation with the bar 58, the bar 61 being braced by the brace irons 62 that are secured to the bar 61 and have their upper ends connected to the bar 57, by means of the rods 63.

As will be seen, due to this construction, the cam discs will operate to force the blade frame downwardly, as the shaft 50 is rotated. Coiled springs indicated by the reference character 64 provide a connection between the upper bar 62' and the lower bars 58 and 61 of the movable frame, through the rods 63' and horizontal bars 64', the springs acting to normally urge the blade frame upwardly. The blade frame supports the vertical spaced shafts 65 that move in the bearings 66 secured to the stationary bars 58'.

At the lower ends of the shafts 65 are spaced blades 67 that are secured to the bars 69, by means of the arms 68 which are shown as bolted to the bars 69. The spaces between the blades 67 accommodate the drills 70, which drills 70 of the blade frame operate in bearings 71 that are also secured to the bars 69 as clearly shown by Figure 6 of the drawings.

These arms 68 extend downwardly where they are secured to the spaced blades 67 by means of the bolts 67'. As shown by Fig. 6 of the drawing, the lower outer surfaces of the arms 68 are beveled as at 68' providing cams to cause the split fruit halves to tilt laterally and fall into the cups 23 for further treatment.

Secured to the shafts 65, adjacent to the upper ends thereof, are pulleys 72, over which the belts 73 operate, the belts 73 moving over the pulleys 37 which are mounted on the horizontal shaft 36 that is mounted in the bearings 75 secured to the super frame. The pulley 34 is mounted on one end of the shaft 36 and transmits movement to the shaft 36, through the belt 35. The belts 73 are twisted, as clearly shown by Figure 2 of the drawings, so that movement from the vertical pulleys 37 may be transmitted to the pulleys 72, which operate in horizontal planes.

Extending rearwardly from the bar 58 of the vertically movable frame, are arms 76, which arms are braced by means of the angle irons 77 that extend upwardly therefrom, the angle irons 77 having their upper ends connected with the upper movable bar 57 of the movable frame.

The arms 76 provide a support for the vertical tubular bearings 78 mounted at the outer ends thereof, and in which the guide fingers 79 operate, the guide fingers being so constructed and arranged that they normally assume the position as shown by Figure 8 of the drawings.

In this position, the guide fingers will move into the depression in the blossom end of the fruit and move over the inclined surface thereof to center the fruit in a vertical position within the split cups or intermediate cups of the groups, so that when the blades 67 move to cut the fruit in halves, a cut through the true center of the fruit will be insured to insure the proper coring of the fruit, which is a step which takes place directly after the cutting of the fruit into halves. The springs 80 which are exceptionally light, and are connected with the guide fingers, act to return the guide fingers to their normal positions, after they have been moved upwardly due to contact with the fruit passing through the machine.

Operating in front of the blades 6 and vertically movable frame supporting the blades, is another vertically movable frame which is supported by the forward pair of vertical uprights 6. This vertically movable frame includes the upper angle bar 81, and the lower angle bar 82, which bars 81 and 82 are connected by the rods 83 that extend through openings formed in the angle bars 81 and 82 adjacent to the ends thereof. The cross bars 84 which form a part of the frame structure, are secured to the forward intermediate upright 6 and are arranged in vertical spaced relation with respect to each other. These bars 84 provide supports for the bearing 85 through which the vertical shafts 86 operate, which shafts also operate through the bearings 87 carried by the upper angle bar 81 of the movable frame. On the upper ends of the shafts 86, are pulleys 88 that operate in horizontal planes. Operating over the pulleys 88 are belts 89 that also operate over the pulleys 90 that are secured to the shaft 30 that in turn is rotated by the motor 27, through the shaft 29, pulley 28, belt 31, and pulley 32 which is secured at one end of the shaft 30, as clearly shown by Figure 2 of the drawings.

Mounted on the upper bar 81 of the vertically movable frame, are rollers 91 over which the cams 92 move, the cams 92 being secured to the shaft 50 which rotates constantly, in a manner as described.

Secured to the lower bar 82 of the vertically movable frame, and disposed adjacent to the ends thereof, are vertical rods 92 which pass through openings in the cross bar 84 adjaecnt to the lower bar 82 of the movable frame. These rods 92 have connection with the lower ends of the coiled springs 93, the upper ends of the coiled sprigns being secured to the upper cross bar 84 by means of the rods 94 which are shown as extending through openings in the upper cross bar 84 and secured by means of the nuts 95. Thus it will be seen that due to this construction, when the cams operate to move the movable frame downwardly, and continue their rotation, the springs will act to return the removable frame to its normal or uppermost position.

Mounted at the lower ends of the shafts 86 are coring blades 96 which operate within the centering bands 97, the cutting edges of the coring blades operating slightly above the free edges of the centering bands 97. Laterally extended ears 98 are formed on the centering bands 97, and accommodate the vertical rods 99 that extend through tubular bearings 100 that are secured to the plates 101 extending from the bar 82 of the vertically movable frame. Coiled springs 102 engage the upper surfaces of the ears 98 and tend to normally urge the centering bands downwardly to their lowermost positions, for contact with the pears to center the pears for contact by the coring blades 96.

Eccentrically connected with one end of the shaft 50, is an operating arm 103, which arm connects with the arm 104 that is secured to the bearing 105 loosely mounted on the end of the shaft 15. Secured to the shaft 15, is a ratchet wheel 106, having the ratchet teeth 107 formed on its periphery, which teeth are engaged by the pawl 108 pivotally mounted at the free end of the arm 104, as clearly shown by Figure 1 of the drawings.

Thus it will be seen that due to this construction, the shafts 15 and 13 will be rotated with an intermittent motion, with the result that the endless chains 17 and 18 together with the bars and cups connected therewith, will be moved intermittently, or with a step by step motion, for purposes to be hereinafter more fully described.

At one end of the machine, is a hopper 109 which is filled with the fruit to be cut and prepared for canning. The operator stands near the hopper, so that he can pick the pears or fruit from the hopper and place them in the intermediate or split cup of each group of cups, the pears being placed vertically in the cups 21, or as near vertically as possible. As the belt moves under the guide finger 79, the guide finger will move into the dimple or depression in the end of the pear at the blossom end to move the fruit to a true vertical position. The fruit now passes forwardly where it will, during the cycle of rotation of the endless chains which carry the cups, move to a position directly under the blades 67. The machine is so timed that the blades will now move downwardly cutting the pear in halves, the drill 70 of the particular blade, passing longitudinally through the fruit to remove what is commonly known as the blossom. The halves of the fruit now fall from the intermediate cups 21 of this particular group to the lateral cups 23, the centers of the pears being disposed upwardly. As the cups move towards the discharge end of the machine, they move under the centering bands 97 which move downwardly contacting with the inner surface of the cut fruit, moving the fruit so that the cut surface thereof will be in a true horizontal plane. Upon further descent of the movable frame carrying the centering band, the coring blade associated therewith will move into the fruit cutting the core therefrom. The halves of the fruit will now be moved to the delivery end of the machine where they may be removed for canning.

It might be further stated that during the preparation of fruit for canning, it is customary in following the recognized method of preparing fruit for canning, to cut the fruit by hand into halves and then subject the fruit to a lye bath to remove the skin. Using applicant's invention, the fruit will be subjected to the lye bath prior to cutting of the fruit, thereby saving a great portion of the meat of the fruit under treatment, which is otherwise destroyed by the lye bath by exposing the cut meat of the fruit to the lye bath.

It might be further stated that the cups are arranged in groups across each machine, and that the number of groups and the number of machines used in a plant may be varied to meet various requirements, without departing from the spirit of the invention.

While I have shown and described the machine for use in preparing pears for canning purposes, it is to be understood that the machine may be used with equally as good results in preparing fruit such as apples or the like for canning purposes.

What is claimed is:

1. A machine for slicing and coring fruit, comprising a frame, an endless carrier mounted for horizontal movement over the frame, groups of fruit receiving cups mounted on the endless carrier and arranged side by side, each of the groups comprising an intermediate cup having slots formed in the side wall thereof, and lateral shallow fruit receiving cups arranged on the endless carrier at opposite sides of the intermediate cup, pairs of vertically reciprocating halving blades mounted on the frame operating with their side faces disposed towards the lateral shallow cups and being movable through said slots halving fruit contained in the intermediate cups, a drill movable with the reciprocating blades and operating between the blades adapted to remove the center of the fruit as the blades move through the fruit, means for tilting the fruit halves laterally, the halves of the fruit falling into the lateral fruit receiving cups, with their core sides disposed upwardly, and coring members for coring the fruit resting in the lateral fruit receiving cups.

2. A machine for slicing and coring fruit, comprising a frame, an endless carrier operating in a horizontal plane, mounted on the frame, said endless carrier embodying spaced chains operating in parallel relationship, bars connecting the chains, said bars being arranged in parallel spaced relationship, groups of fruit receiving cups mounted on the bars, each group embodying a center line of cups and lines of lateral cups disposed at opposite sides of the center line of cups adjacent thereto, vertically movable slicing blades operating above the center line of cups movable through fruit held in the center cups, halving the fruit positioned within the cups, means movable with the blades for tilting the fruit halves laterally into the lateral cups with their core sides disposed upwardly, coring blades movable into engagement with the fruit halves resting in the lateral cups, holding the fruit halves therein, and centering means movable with the coring blades centering and holding the fruit within the lateral cups for coring.

3. A machine for slicing and coring fruit comprising a frame, an endless carrier movable in a horizontal plane, mounted on the frame, a center line of cups mounted on the endless carrier, lines of receiving cups disposed at opposite sides of the center line of cups adjacent thereto, halving blades operating above the carrier and movable into engagement with fruit held in the center line of cups, drills carried by the blades movable through the centers of the fruit removing the centers of the fruit, said blades forcing the fruit halves laterally into the receiving cups with the core sides of the fruit disposed upwardly, rotating coring blades operating within the frame movable into engagement with the cores of the fruit halves resting in the receiving cups coring the fruit, and means for operating the endless carrier whereby the fruit is successively moved under the cutting blades and coring blades.

4. A machine for slicing and coring fruit, comprising a frame, an endless carrier mounted on the frame and operating in a horizontal plane thereover, a center line of cups mounted on the endless carrier, lines of receiving cups mounted on the carrier at opposite sides of the center line of cups and adjacent thereto, said center line of cups supporting fruit to be sliced, vertically movable slicing blades movable through the centers of the fruit held in the center line of cups halving the fruit, cams mounted on the blades engaging the fruit halves moving the fruit halves laterally into the receiving cups, rotating coring blades movable into engagement with the cores of the fruit halves coring the fruit halves, and yieldable centering bands movable into engagement with the fruit halves centering and holding the fruit in the receiving cups during the coring operation.

ESTON ALTMAN.

REFERENCES CITED

The following references are of record in the file of this patent:

UNITED STATES PATENTS

| Number | Name | Date |
|---|---|---|
| 439,155 | Hunter | Oct. 28, 1890 |
| 802,388 | Goossen | Oct. 24, 1905 |
| 1,529,127 | Haller | Mar. 10, 1925 |
| 1,610,236 | Ayars | Dec. 14, 1926 |
| 1,766,824 | Jones | June 24, 1930 |
| 2,114,218 | Edenfield | Apr. 12, 1938 |

FOREIGN PATENTS

| Number | Country | Date |
|---|---|---|
| 7,877 | Australia | June 21, 1927 |